US012780988B2

(12) United States Patent
Noda et al.

(10) Patent No.: US 12,780,988 B2
(45) Date of Patent: Nov. 3, 2026

(54) VISCOSITY MODIFIER AND FILM-FORMING AGENT CONTAINING SAME

(71) Applicant: KYOEISHA CHEMICAL CO., LTD., Osaka (JP)

(72) Inventors: Shu Noda, Nara (JP); Yousuke Kataoka, Nara (JP); Nobuaki Nakatsuka, Nara (JP); Masahiro Takagi, Nara (JP)

(73) Assignee: KYOEISHA CHEMICAL CO., LTD., Osaka (JP)

( * ) Notice: Subject to any disclaimer, the term of this patent is extended or adjusted under 35 U.S.C. 154(b) by 549 days.

(21) Appl. No.: 17/917,136

(22) PCT Filed: Nov. 17, 2021

(86) PCT No.: PCT/JP2021/042169
§ 371 (c)(1),
(2) Date: Oct. 5, 2022

(87) PCT Pub. No.: WO2022/107792
PCT Pub. Date: May 27, 2022

(65) Prior Publication Data

US 2023/0151154 A1 May 18, 2023

(30) Foreign Application Priority Data

Nov. 18, 2020 (JP) ................................ 2020-191489

(51) Int. Cl.

| | |
|---|---|
| ***C09D 7/65*** | (2018.01) |
| ***C08G 69/44*** | (2006.01) |
| ***C09D 177/12*** | (2006.01) |
| ***C09J 11/08*** | (2006.01) |
| ***C09J 177/12*** | (2006.01) |
| ***C09K 3/10*** | (2006.01) |

(52) U.S. Cl.
CPC ............... *C08G 69/44* (2013.01); *C09D 7/65* (2018.01); *C09D 177/12* (2013.01); *C09J 11/08* (2013.01); *C09J 177/12* (2013.01); *C09K 3/10* (2013.01); *C09K 2200/0667* (2013.01)

(58) Field of Classification Search
CPC ........ C09J 177/12; C08G 69/26; C08G 69/28; C08G 69/265; C08L 77/00
See application file for complete search history.

(56) References Cited

U.S. PATENT DOCUMENTS

| | | | | |
|---|---|---|---|---|
| 3,957,733 | A | 5/1976 | Rogier et al. | |
| 4,128,436 | A | 12/1978 | O'Hara et al. | |
| 4,778,843 | A | 10/1988 | Cooperman et al. | |
| 2009/0042047 | A1 | 2/2009 | Nataniel et al. | |
| 2012/0059093 | A1 | 3/2012 | Murayama et al. | |
| 2013/0053490 | A1 * | 2/2013 | Yamanishi | C07C 237/22 524/210 |
| 2016/0027283 | A1 * | 1/2016 | Bernard | C08K 5/20 |

FOREIGN PATENT DOCUMENTS

| | | | | |
|---|---|---|---|---|
| CN | 101863792 | A | 10/2010 | |
| CN | 102485817 | A * | 6/2012 | C09D 133/00 |
| CN | 105705542 | A | 6/2016 | |
| CN | 210058259 | U * | 2/2020 | B01J 19/18 |
| EP | 3919546 | A1 | 12/2021 | |
| JP | S56-47231 | B2 | 11/1981 | |
| JP | S63-145332 | A | 6/1988 | |
| JP | H07-75894 | A | 3/1995 | |
| JP | 2974493 | B2 * | 11/1999 | C09D 7/12 |
| JP | 2002-38116 | A | 2/2002 | |
| JP | 2020-84003 | A | 6/2020 | |
| KR | 10-0814004 | B1 | 3/2008 | |
| WO | 2020/158252 | A1 | 8/2020 | |

OTHER PUBLICATIONS

CN102485817 A English (Year: 2012).*
Ueda et al., "Study on Solubility Parameter of Paint Additives", Research on Coatings, 2010, pp. 41-46, No. 152.
Feb. 8, 2022 International Search Report Issued in International Patent Application No. PCT/JP2021/042169.
Feb. 8, 2022 Written Opinion issued in International Patent Application No. PCT/JP2021/042169.
Sep. 6, 2024 Extended European Search Report issued in European Patent Application No. 21894666.3.
Mar. 26, 2026 Office Action issued in Korean Patent Application No. 10-2022-7039659.
Mar. 25, 2026 Office Action issued in Chinese Patent Application No. 202180077342.1.

* cited by examiner

*Primary Examiner* — Catherine S Branch
*Assistant Examiner* — Huihong Qiao
(74) *Attorney, Agent, or Firm* — Oliff PLC

(57) ABSTRACT

A viscosity modifier is thermally stable and can provide an excellent viscosity-increasing effect and/or an anti-sagging effect, and is used by the addition to a paint, a coating agent, a painting agent, a flux, an adhesive material, and a sealing material that are produced/used under high temperature conditions. A film-forming agent contains the viscosity modifier including a polyamide component that contains a polyamide compound from a C2-10 aliphatic and/or C6-10 aromatic primary diamine and a C12-36 polybasic acid and/or a C12-30 unsubstituted or hydroxy-substituted aliphatic monocarboxylic acid. The film-forming agent contains the viscosity modifier and a film-forming component and is at least any one selected from a paint, a coating material, a painting material, a flux, an adhesive material, and a sealing material.

7 Claims, No Drawings

VISCOSITY MODIFIER AND FILM-FORMING AGENT CONTAINING SAME

TECHNICAL FIELD

The present invention relates to a viscosity modifier and a film-forming agent containing the same that can provide an excellent viscosity-increasing effect and/or an anti-sagging effect, and which are used by the addition to a paint, a coating agent, a painting agent, a flux, an adhesive material, and a sealing material, especially, to a paint, a coating agent, a painting agent, a flux, an adhesive material, and a sealing material that are produced/used under high temperature conditions at 50° C.-200° C.

BACKGROUND ART

Various kinds of additives are used for a paint for automotive, architectural, electronic or plastic materials, a coating agent, a painting agent, a flux, an adhesive material, and a sealing material. Among these additives, a viscosity modifier is used to modify viscosity, and, depending on the purpose, this is also referred to as a thixotropic agent, a thixotropy agent, a thickener agent, an anti-sagging agent, or an anti-settling agent for a filler component.

In recent years, as for such paints, in consideration of the environment, switching to high-solidification or a solvent-free system is being promoted worldwide by increasing the ratio of a resin or a pigment component with the aim of reducing organic solvents, especially volatile organic solvents, contained in the paint.

When organic solvents are reduced, the heat of dispersion is generated by mixing a paint, and heat up to 50° C.-60° C., further nearly to 80° C. by using a sand-grinder, due to a relative increase in the concentration of solids in the paint. Therefore, an additive to be used, especially a viscosity modifier such as an amide compound that has been commonly used, is preferably composed of a composition having a heat-resistance property.

Patent document 1 discloses that a paint composition contains an epoxy resin, an amine curing agent such as polyamideamine, a scaly aluminum powder, and other aluminum powder as a coating composition that has excellent coating workability/corrosion resistance ability with a low volatile organic component amount and can form an anti-corrosion coating film with good adhesion to a base material even when an electric anticorrosion system is used together.

As a material prepared under higher temperature conditions, for example, Patent document 2 discloses a sealing material containing, specifically, a rubber polymer (A) obtained by grafting a styrene-diene copolymer or its hydrogenated one (a1) with a polymerizable monomer (a2) that has the compression permanent distortion (JIS K6301) at 70° C. for 22 h being 35% or less and also the hardness (JIS K6301) at 20° C. being 5 or less. And also this document states that, in the sealing material composed of a hot-melt component, the melting temperature of the sealing material when applied to an adherent is usually 100-200° C.; in addition, from a viewpoint of coatability the melting viscosity of the sealing material is favorably 5,000-1000,000 mPa·s, and more favorably 10,000-200,000 mPa·s.

In a printed circuit board and an integrated circuit used in electronic materials, a reflow method is known as an industrial method for soldering electronic components such as a resistance and a capacitor. The reflow method is a method of printing a solder paste in which a flux containing a resin component, a solvent component, an activator, a thixotropy agent, and an additive and a solder powder are mixed on the printed circuit board followed by, after mounting an electronic component on it, soldering by applying heat and melting the solder. Since a surface mounting technology using electronic components without a lead pin has been adopted in accordance with miniaturization and high density mounting electronic components, the reflow method is now mainly used for soldering.

In the reflow method, after the solder paste is printed on a printed circuit board, the pre-heating called pre-heat is performed in a reflow reactor. The pre-heat is performed usually at 150-170° C. The pre-heat causes the solvent component to vaporize and also promotes the activity of a flux.

In the pre-heat, the printed solder paste may frequently soften and hence cause heat-dripping, that is, a phenomenon that flows under or around electronic components on a printed circuit board. The heat-dripping is a cause of poor soldering due to the induction of solder balls and solder bridges in a main heat. To control the heat-dripping, Patent document 3 discloses that a solder paste (a cream solder) in which a flux containing a waxy-like product, that is a heat-drip suppressing component, as a thixotropy agent and a solder powder are mixed. The waxy-like product can be obtained by the dehydration reaction of a higher aliphatic monocarboxylic acid and a polybasic acid with a diamine. For example, a wax made of a polyamide from stearic acid (carbon number 18) and sebacic acid (carbon number 10) with ethylene diamine (carbon number 2) is shown in the Application examples.

Since the heat-drip suppressing component is powdered or tubular at room temperature, to disperse it evenly to the flux it is necessary to conduct the heat treatment at high temperatures for a long time and to mix by melting it. Due to this heat treatment at high temperatures and also its long-time process, a thermal damage such as deterioration of the heat-drip suppressing component, decomposition/alternation of the resin component contained in the flux, and coloring of the flux occurs. On the other hand, to avoid this thermal damage, shortening the heat treatment time or lowering the temperature will result in poor dispersion of the heat-drip suppressing component.

In this situation, it was desired to have a viscosity modifier which can provide an excellent viscosity-thickening property and an anti-sagging property for a paint, a coating agent, a painting agent, a flux, an adhesive material, and a sealing material that are produced/used at high temperatures.

PRIOR ART DOCUMENT

Patent Document

[Patent Document 1] JP2020-84003A1
[Patent Document 2] JP2002-38116A1
[Patent Document 3] JPH07-75894A1

SUMMARY OF INVENTION

Problem to be Solved by the Invention

The present invention is made to solve the problems, and its object is to provide a viscosity modifier that is thermally stable and can provide an excellent viscosity-increasing effect and/or an anti-sagging effect, and which is used by the addition to a paint, a coating agent, a painting agent, a flux, an adhesive material, and a sealing material that are produced/used under high temperature conditions. Also provided is a film-forming agent that contains the viscosity modifier.

Means to Solve the Above Problems

As a result of the inventors' extensive efforts to solve these problems, the inventors found that these problems could be solved by preparing a viscosity modifier characterized by its composition of a polyamide component that contains a polyamide compound from a specific C2-10 aliphatic and/or C6-10 aromatic primary diamine and a C12-36 aliphatic dicarboxylic acid and/or a C12-30 unsubstituted or hydroxy-substituted aliphatic monocarboxylic acid, and thus completed the present invention.

The viscosity modifier made to achieve these objectives comprises a polyamide component that contains a polyamide compound from a C2-10 aliphatic and/or C6-10 aromatic primary diamine and a C12-36 linear polybasic acid and/or C12-30 linear, saturated and unsubstituted or hydroxy-substituted aliphatic monocarboxylic acid, wherein a melting point of the polyamide component is 120° C.-250° C., and a softening point of the polyamide component is 180° C.-194° C.

In the viscosity modifier, the polyamide component contains favorably at least any one of the polyamide compounds from the aliphatic and/or aromatic primary diamine and an aliphatic dicarboxylic acid as the polybasic acid with an equivalence in regard to amino groups thereof, and the other polyamide compounds from the aliphatic and/or aromatic primary diamine and the aliphatic dicarboxylic acid as the polybasic acid and the unsubstituted or hydroxy-substituted aliphatic monocarboxylic acid with equivalences in regard to amino groups thereof.

It is favorable that in the viscosity modifier, the polyamide compound from the aliphatic and/or aromatic primary diamine and an aliphatic dicarboxylic acid as the polybasic acid and the unsubstituted or hydroxy-substituted aliphatic monocarboxylic acid, is a principal ingredient of the polyamide component.

Specifically, in the viscosity modifier, the polyamide component includes the polyamide compound of any one of the polyamides (provided that $a+c>0$) from a ($0\leq a\leq 2$) mol in total by mol ratio of the unsubstituted or hydroxy-substituted aliphatic monocarboxylic acid, b ($2\leq b\leq 6$) mol in total by mol ratio of the aliphatic and/or aromatic primary diamine and c ($0\leq c\leq 5$) mol in total by mol ratio of the polybasic acid.

In the viscosity modifier, it is preferable that a melting point of the polyamide component is 120° C.-200° C.

In the viscosity modifier, the amide component includes plural molecular species of polyamide compounds.

For example, the viscosity modifier has a softening point of the polyamide component being 180° C.-194° C. The softening point could be favorably 190° C.-192° C.

In the viscosity modifier, a solubility parameter value of the polyamide component, which is determined by a Fedors method, is more favorably 9.0-10.2.

The viscosity modifier is used as an additive for any one of purposes selected from the group consisting of, for example, a paint, a coating material, a painting material, a flux, an adhesive material, and a sealing material.

The viscosity modifier is used, for example, as an additive for any one of purposes selected from the group consisting of a paint, a coating material, a painting material, a flux, an adhesive material, and a sealing material, which are for manufacturing and/or using under high temperature conditions at 50° C.-200° C., and also used for an imparting agent of a viscosity-thickening property and/or an anti-sagging property.

The viscosity modifier is favorably powdery.

The viscosity modifier can be used as a thixotropic agent, a thixotropy agent, a thickener agent, an anti-sagging agent, and/or an anti-settling agent for a filler component.

In the present invention made to solve the problems, a method for producing the viscosity modifier of the present invention comprises: a step for preparing a polyamide component by dehydration of a C2-10 aliphatic and/or C6-10 aromatic primary diamine with a C12-36 linear polybasic acid and/or a C12-30 linear, saturated and unsubstituted or hydroxy-substituted aliphatic monocarboxylic acid to form a polyamide compound in which a melting point of the polyamide component is 120° C.-250° C. and a softening point of the polyamide component is 180° C.-194° C., and a step for producing the viscosity modifier containing the polyamide component by pulverizing the polyamide component.

In the present invention made to solve the problems, a film-forming agent of the present invention contains the viscosity modifier and a film-forming component, and is at least any one selected from the group consisting of a paint, a coating material, a painting material, a flux, an adhesive material, and a sealing material.

Effects of the Invention

The viscosity modifier of the present invention can be added to a paint, a coating material, a painting material, a flux, an adhesive material, and a sealing material to modify viscosity. This is also thermally stable and does not deteriorate even by heating, and it can provide an excellent viscosity-increasing effect as well as an anti-sagging effect even when heating. The use of this viscosity modifier can inhibit thermal damage through the reduction of the heat treatment time and does not cause poor dispersion when a paint, a coating material, a painting material, a flux, an adhesive material, and a sealing material are produced/used at high temperatures.

The viscosity modifier is added as an additive for a paint, or the like, and used after it has been activated or dissolved. Accordingly, it can provide such an excellent effect to a paint, a coating material, or a painting material, or a flux, or a viscosity modifier for an adhesive material and a sealing material (that is, a thixotropic agent, a thixotropy agent, a thickener agent, an anti-sagging agent, and/or an anti-settling agent for a filler component).

The viscosity modifier can provide a viscosity-thickening property and/or an anti-sagging property not only to, in general, a paint, a coating material, and a painting material that are used at low or ambient temperature, but also to a powder viscosity modifier that is effective for a flux, an adhesive material, and a sealing material that require a producing process at high temperatures to be heated.

According to this method for producing the viscosity modifier, it can be achieved to easily mass-produce the homogeneous viscosity modifier with high-quality.

By using the film-forming agent containing the viscosity modifier of the present invention, a paint, a coating material, a painting material, a flux, an adhesive material, and a sealing material can be produced/used even at high temperatures, and the viscosity-thickening property and the anti-sagging property can be improved.

EMBODIMENTS TO IMPLEMENT THE INVENTION

The following details embodiments for carrying out the present invention, but the scope of the present invention is not limited to these embodiments.

A viscosity modifier of the present invention comprises a polyamide component that contains a polyamide compound obtained by condensation of a C2-10 linear/branched and/or cyclic saturated or unsaturated aliphatic and/or C6-10 aromatic primary diamine with a C12-36 linear/branched and/or cyclic saturated or unsaturated polybasic acid such as an aliphatic dicarboxylic acid, an alicyclic dicarboxylic acid, an aromatic dicarboxylic acid, and/or a C12-30 linear/branched chain and/or cyclic saturated or unsaturated, unsubstituted or hydroxy-substituted aliphatic monocarboxylic acid.

As the C2-10 aliphatic and/or C6-10 aromatic primary diamine, specifically, it may be ethylenediamine, 1,3-propanediamine, 1,4-butanediamine, hexamethylenediamine, m-xylenediamine, tolylenediamine, p-xylenediamine, phenylenediamine, isophoronediamine, and 1,10-decanediamine. These diamines can be used alone or with mixes.

The C12-36 polybasic acid may be a carboxylic acid with multiple carboxyl groups, and among these a dicarboxylic acid is more favorable. As the dicarboxylic acid, it may be dodecanedioic acid, tridecanedioic acid, tetradecanedioic acid, pentadecanedioic acid, hexadecanedioic acid, heptadecanedioic acid, octadecanedioic acid, nonadecanedioic acid, eicosanedioic acid, dimer acid, or the like. These C12-36 polybasic acids can be used alone or with mixes or not.

The C12-30 unsubstituted or hydroxy-substituted aliphatic monocarboxylic acid may be, for example, a fatty acid having a carboxyl group at the terminal, and also a linear, branched and/or cyclic saturated or unsaturated aliphatic carboxylic acid having optionally one or two hydroxyl groups. Specifically, it may be a saturated aliphatic monocarboxylic acid such as lauric acid, myristic acid, palmitic acid, and stearic acid, and a saturated aliphatic monocarboxylic acid having a hydroxyl group such as 12-hydroxystearic acid; an unsaturated aliphatic monocarboxylic acid such as oleic acid, linoleic acid, and linolenic acid. It can be a mixture having one of these as a principal ingredient and also containing the other aliphatic monocarboxylic acid, for example, industrial stearic acid. These C12-30 unsubstituted or hydroxy-substituted aliphatic monocarboxylic acids can be used alone or with mixes or not.

Here, the polyamide compound is a condensed polyamide of at least any one of polybasic acids such as a dicarboxylic acid and an unsubstituted or hydroxy-substituted aliphatic monocarboxylic acid with an aliphatic and/or aromatic primary diamine. The polyamide component can be a single or a mixture of multiple species of the condensed polyamide.

For example, the polyamide component may contain at least any one of the polyamide compounds from the aliphatic and/or aromatic primary diamine and the aliphatic dicarboxylic acid with an equivalence in regard to amino groups thereof, and the other polyamide compounds from the aliphatic and/or aromatic primary diamine and the aliphatic dicarboxylic acid and the unsubstituted or hydroxy-substituted aliphatic monocarboxylic acid with equivalences in regard to amino groups thereof. It is more favorable that the polyamide compounds from the aliphatic and/or aromatic primary diamine and the aliphatic dicarboxylic acid and the unsubstituted or hydroxy-substituted aliphatic carboxylic acid should be a principal ingredient of the polyamide component.

Specifically, the polyamide component may contain as follows:

(I) a single or multiple polyamide compound obtained by dehydration-condensation of ($n_1$+1) mol ratio of a C2-10 aliphatic and/or C6-10 aromatic primary diamine with $n_1$ mol ratio of a C12-36 polybasic acid, and 2 mol ratio of a C12-30 unsubstituted or hydroxy-substituted aliphatic monocarboxylic acid (in which $n_1$ is 1-3, preferably 1);

(II) a single or multiple polyamide compound obtained by dehydration-condensation of 1 mol ratio of a C2-10 aliphatic and/or C6-10 aromatic primary diamine with 1 mol ratio of a C12-36 polybasic acid; or (III) a single or multiple polyamide compound obtained by dehydration-condensation of 1 mol ratio of a C2-10 aliphatic and/or C6-10 aromatic primary diamine with 2 mol ratio of a C12-30 unsubstituted or hydroxy-substituted aliphatic monocarboxylic acid.

More specifically, as the single or multiple polyamide compound of (I), the single or multiple polyamide compound of (II), and the single or multiple polyamide compound of (III), while the polyamide component contains the polyamide compound shown by the following chemical formula (1) as the principal ingredient:

$$\text{M-D-A-D-M} \quad (1)$$

(in the chemical formula (1), M is an aliphatic monocarbonyl group derived from the unsubstituted or hydroxy-substituted aliphatic monocarboxylic acid, D is a diamino group derived from the aliphatic and/or aromatic primary diamine, and A is an aliphatic dicarbonyl group derived from the aliphatic dicarboxylic acid), and also the polyamide component contains at least any one of the polyamide compounds selected from the polyamide compounds shown by the following chemical formula (2):

$$\text{M-D-M} \quad (2)$$

(in the chemical formula (2), M and D are the same as above), the polyamide compound shown by the following chemical formula (3):

$$\text{M-(D-A)}_n\text{-D-M} \quad (3)$$

(in the chemical formula (3), M, A and D are the same as above, n is a number of 2-3), and the polyamide compounds shown by the following chemical formula (4):

$$\text{A}_{m1}\text{-(D-A)}_{m2}\text{-D}_{m3} \quad (4)$$

(in the chemical formula (4), D and A are the same as above, m1 and m3 are independently the number of 0 or 1, m1+m2+m3 is a number of 2-6).

For example, in the polyamide component, the favorable ratio of the single or multiple polyamide compound in (I) is a mixture of 70%-85% of the polyamide compound shown by the chemical formula (1), 10%-20% of the polyamide compound shown by the chemical formula (2), 5%-10% of the polyamide compound shown by the chemical formula (3), and 0%-15% of the polyamide compound shown by the chemical formula (4); the favorable ratio of the single or multiple polyamide compound in (II) is a mixture of at least any one of the polyamide compounds shown by the chemical formula (4); the favorable ratio of the single or multiple polyamide compound in (III) is the polyamide compound shown by the chemical formula (2).

The melting point of the polyamide component is 100° C.-250° C., favorably 120° C.-200° C. The polyamide component may have a multiple softening point, depending on a mixture of multiple molecular species of polyamide compounds.

Just like the polyamide component, when handling materials having the multiple melting point, the softening point is often measured and used for practical work.

The softening point of the polyamide component is 180° C.-194° C., favorably 190° C.-192° C. The softening point was measured with an Automatic drip point/softening point measuring device (Mettler-Toledo Co., Ltd.).

When the viscosity modifier with characteristics of the polyamide component is added to a paint, a coating material, a painting material, a flux, an adhesive material, and a sealing material, the softening point greatly affects the properties of viscosity-thickening in which the polyamide composition is activated to form a network or viscosity-thickening in which the polyamide solidifies after thermal-melting.

The present invention is characterized by the softening point of 180° C.-194° C., favorably 190° C.-192° C. For a paint, a coating agent, a painting agent, a flux, an adhesive material, and a sealing material, which are manufactured and/or used under high temperature conditions at 50° C.-200° C., especially in the field for manufacturing under high temperature conditions and/or using at around 200° C., the present invention exhibits its characteristics and effects of viscosity-thickening by solidifying after thermal-melting. In contrast, if the softening point is 195° C. or more, a partial leftover melting occurs during thermal dissolution, and it cannot achieve the sufficient activation, so it will be unable to provide their excellent effects as the viscosity modifier (that is, a thixotropic agent, a thixotropy agent, a thickener agent, an anti-sagging agent, and/or an anti-settling agent for a filler component).

The viscosity modifier has a solubility parameter value of the polyamide compound as a principal ingredient of the polyamide component, for example, M-D-A-D shown in the chemical formula (1), being 9.0-10.2, which is determined by a Fedors method. The solubility parameter value is used as an indicator of compatibility when similar or different materials meet, solubility, familiarity, or wettability. The closer the numbers are to each other, the more familiar it is. If the solubility parameter value of the polyamide component is within this range, the solubility parameter values of the coexisting resin such as an epoxy resin and a rosin resin (the solubility parameter value is 10.3-10.4) and the polyamide component are about the same and the compatibility is excellent. However, outside of this range, the solubility parameter values of the coexisting resin and the polyamide component are significantly different, causing poor compatibility.

As the method to estimate the solubility parameter value (SP value), for example, there are a method to estimate from physical property values such as a method obtained from latent heat of vaporization and a method obtained from solubility, and a method to estimate from molecular structure such as a Fedors method, a Hansen method, and a Hoy method. And in the present invention, it can be sufficiently differentiate by the Fedors method, which is relatively easy to use, and hence the Fedors method is adopted. The theoretical solubility parameter value by the Fedors method can be obtained from the following expression (1).

[Mathematical Expression 1]

$$\text{Solubility parameter value} = \left\{ \frac{\sum_i \Delta e_i}{\sum_j \Lambda v_j} \right\}^{1/2} \quad (1)$$

(In the expression (1) $\Delta e_1$ and $\Delta v_i$ represent a vaporization energy (aggregation energy) and a molecular volume (molar molecular volume) of atoms or atomic groups, respectively.) Examples of such the vaporization energy (aggregation energy) and the molecular volume (molar molecular volume) can be found, for example, in the followings: Polym. Eng. Sci., 14(2), p. 147-154 (1974); Research on Coating, No. 152, October, p. 41-46 (2010).

The viscosity modifier utilizes a structural viscosity of insoluble materials when added to a paint, a coating material, a painting material, a flux, an adhesive material, and a sealing material. If the familiar material whose solubility parameter value is the same as the medium is used, it does not function as a viscosity-thickening agent, but as a gliding agent due to the reduction of viscosity. When used as shown in Embodiments, it exerts an excellent viscosity-thickening property, an anti-sagging property, and an effect as an anti-settling agent for a filler by appropriately diverging the solubility parameter values. In addition, the solubility parameter values determined by the Fedors method for the epoxy resin and the rosin resin used in Embodiments are 10.3-10.4, respectively.

The viscosity modifier may consist only of the polyamide component, or may also contain 0.1-100% by weight of an additive such as an anti-foaming agent, an anti-rusting agent, surfactants, a thermosetting agent, a matting agent, a leveling agent, a lubricant, a wetting agent, and a dispersant with respect to the total amount of the viscosity modifier.

It is desirable that the powder of the viscosity modifier is mixed with raw components followed by cooling after amide condensation, and then ground to a finely pulverized powder having a particle size of 100 μm or less, favorably 60 μm or less, more favorably 30 μm.

By mixing the finely pulverized powder of the viscosity modifier, film-forming components, and, if necessary, a solvent such as an alcohol component, a film-forming agent selected from at least any one of a paint, a coating material, a painting material, a flux, an adhesive material, and a sealing material can be prepared.

The film-forming agent is partially dissolved and activated to form a network and to be viscosity-thickened when the polyamide component of the viscosity modifier is dispersed in the film-forming component, and also is viscosity-thickened when the polyamide component is solidified after thermal-melting.

The finely pulverized powder of the viscosity modifier can be dispersed to a non-aqueous coating material using a mechanical dispersion such as dispers or a wet-dispersing machine by using media type such as a glass bead, or the like. In addition, it can also be dispersed to a non-aqueous paint. When preparing the paint, the coating agent, the painting agent, the flux, the adhesive material, and the sealing material, the finely pulverized powder is mixed so that it is 1-10 mass %, favorably 1-5 mass %, of a total amount of the paint and so on.

The viscosity modifier can provide an excellent viscosity-increasing effect and/or an anti-sagging effect to the paint, the coating agent, the painting agent, the flux, the adhesive material, which are manufactured and/or used especially under high temperature conditions (50° C.-200° C.).

EMBODIMENTS

The following shows examples of the preparation of a viscosity modifier which is applied with the present invention and a viscosity modifier which is not applied with the present invention, the manufacturing of a film-forming agent by applying them, and finally the evaluation of physical properties on each individual.

(Preparation Example 1) Preparation of Polyamide Component by Condensation Reaction to Polyamide Compound To a 1000 mL reaction vessel equipped with a stirrer, a thermometer, a water divider, and a nitrogen gas inlet were introduced 338.9 parts by mass (2 mol ratio) of 12-hydroxystearic acid as an aliphatic monocarboxylic acid and 161.5 parts by mass (1 mol ratio) of hexadecanedioic acid as an aliphatic dicarboxylic acid so that they gave the equivalent of the polyamide compound shown in the chemical formula (1). Then 99.5 parts by mass (2 mol ratio) of 1,4-diaminobutane as an aliphatic and/or aromatic primary diamine was added, and the mixture was subjected to amidation by dehydration-condensation for 2-5 hours at 170° C. under a nitrogen atmosphere to give the polyamide compound with an acid value of 8.2 and an amine value of 8.8. The resulting synthetic substance was pulverized to an average particle size of 15 μm, and the fine powdery additive was obtained as the viscosity modifier composed of the polyamide component containing the polyamide compound shown in the chemical formula (1) as a principal ingredient.

(Preparation Examples 2-8, Comparative Preparation Examples 1-8) Preparation of Polyamide Component by Condensation Reaction to Polyamide Compound In a similar manner as in Preparation example 1, the use of an aliphatic monocarboxylic acid and/or an aliphatic dicarboxylic acid and an aliphatic and/or aromatic primary diamine in a mol ratio shown in Table 1-1 and Table 1-2 gave the polyamide component containing the polyamide compound with an acid value of 10 or less and an amine value of 10 or less, respectively.

In addition, the polyamide components containing the polyamide compounds in Preparation examples 1-8 and Comparative preparation examples 1-8 were prepared by dehydration-condensation of an aliphatic monocarboxylic acid and/or an aliphatic dicarboxylic acid with an aliphatic and/or aromatic primary diamine in a mol ratio as an exactly theoretical quantity shown in Table 1-1 and Table 1-2 to form the chemical formulae (1), (2) or (4). And, in practice, even when the raw components were different, they contained 70%-85% of the polyamide compound in chemical formula (1), 10%-20% of the polyamide compound in chemical formula (2), 5%-10% of the polyamide compound in chemical formula (3), and 0%-15% of the polyamide compound in chemical formula (4).

Furthermore, with respect to the polyamide compounds obtained in Preparation examples 1-8 and Comparative preparation examples 1-8, the solubility parameter values determined by a Fedors method, the acid values, and the amine values of the polyamide compounds shown in the chemical formula (1) as a principal ingredient are summarized in Table 1-1 and Table 1-2.

TABLE 1-1

| List of composite ratios | | | | | | | | |
|---|---|---|---|---|---|---|---|---|
| | Amide synthesis ratio (Molar ratio) | | | | | | | |
| Raw material name | Ex.1 | Ex.2 | Ex.3 | Ex.4 | Ex.5 | Ex.6 | Ex.7 | Ex.8 |
| Butanoic acid | | | | | | | | |
| Octadecanedioic acid | | | | | | | | |
| Lauric acid | | | | | 2 | | | |
| Stearic acid | | | 2 | 1 | | | | |
| Sebacic acid | | | | | | | | |
| 12-Hydroxystearic acid | 2 | 1 | | 1 | | 2 | | 2 |
| Oleic Acid | | | | | | | | |
| Undecanedioic acid | | | | | | | | |
| Icosanedioic acid | | | | | 1 | | | 2 |
| Dodecanedioic acid | | | 1 | | | 1 | 1 | |
| Hexadecanedioic acid | 1 | 1 | | | | | | |
| Adipic acid | | | | | | | | |
| Tetradecanedioic acid | | | | 1 | | | | |
| Montanic acid | | 1 | | | | | 2 | |
| Ethylenediamine | | | 2 | 2 | | | 2 | |
| Metaxylenediamine | | 2 | | | | | | |
| Hexamethylenediamine | | | | | | 2 | | 3 |
| 1,4-diaminobutane | 2 | | | | 2 | | | |
| Solubility parameter value | 10.2 | 10.0 | 9.6 | 10.0 | 9.6 | 10.2 | 9.3 | 10.0 |
| Acid value (mgKOH/g) | 8.2 | 7.5 | 5.2 | 6.7 | 4.5 | 4.0 | 9.3 | 3.8 |
| Amine value (mgKOH/g) | 8.8 | 8.2 | 5.1 | 6.1 | 4.2 | 4.5 | 8.8 | 4.2 |

TABLE 1-2

List of composite ratios

| Raw material name | Amide synthesis ratio (Molar ratio) Comp. Ex.1 | Comp. Ex.2 | Comp. Ex.3 | Comp. Ex.4 | Comp. Ex.5 | Comp. Ex.6 | Comp. Ex.7 | Comp. Ex.8 |
|---|---|---|---|---|---|---|---|---|
| Butanoic acid | | | 2 | | 2 | 1 | | |
| Octadecanedioic acid | | | 1 | | | | | |
| Lauric acid | | | | | | 1 | | 2 |
| Stearic acid | | | | | | | | |
| Sebacic acid | | | | | | | 1 | |
| 12-Hydroxystearic acid | 2 | 2 | | 2 | | | 2 | |
| Oleic Acid | | | | | | | | |
| Undecanedioic acid | | 1 | | 1 | | | | 3 |
| Icosanedioic acid | | | | | | | | |
| Dodecanedioic acid | | | | | | 1 | | |
| Hexadecanedioic acid | | | | | | | | |
| Adipic acid | 1 | | | 1 | 1 | | | |
| Tetradecanedioic acid | | | | | | | | |
| Montanic acid | | | | | | | | |
| Ethylenediamine | | | | 1 | | | | 4 |
| Metaxylenediamine | | 2 | | | | 2 | | |
| Hexamethylenediamine | 2 | | | | 2 | | 2 | |
| 1,4-diaminobutane | | | 2 | | | | | |
| Solubility parameter value | 10.4 | 11.0 | 10.1 | 10.7 | 10.5 | 10.5 | 10.3 | 10.4 |
| Acid value (mgKOH/g) | 9.1 | 8.5 | 7.6 | 9.5 | 3.7 | 5.2 | 4.2 | 8.4 |
| Amine value (mgKOH/g) | 9.4 | 8.7 | 7.4 | 9.3 | 3.4 | 5.3 | 3.9 | 7.2 |

The softening points of the polyamide components obtained in Preparation examples 1-8 and Comparative preparation examples 1-8 are shown in Table 2.

TABLE 2

List of softening points

| Sample name | Softening point (° C.) |
|---|---|
| Example.1 | 193.0 |
| Example.2 | 193.0 |
| Example.3 | 190.0 |
| Example.4 | 191.0 |
| Example.5 | 188.0 |
| Example.6 | 190.0 |
| Example.7 | 193.0 |
| Example.8 | 192.0 |
| Comparative example. 1 | 201.0 |
| Comparative example.2 | 199.0 |
| Comparative example.3 | 199.0 |
| Comparative example.4 | 198.0 |
| Comparative example.5 | 197.0 |
| Comparative example.6 | 195.0 |
| Comparative example.7 | 195.0 |
| Comparative example.8 | 205.0 |

Application Example I (Preparation of Paint Sample and Blank Paint Sample for Evaluation: Condition A)

The 135 parts by mass of epoxy resin jER 828 (trade name, available from Mitsubishi Chemical Co., Ltd.), 15 parts by mass of titanium oxide TIPAQUE CR-95 (trade name, available from Ishihara Sangyo Kaisha, Ltd.), 60 parts by mass of talc, 60 parts by mass of precipitating barium sulfate, and 30 parts by mass of thinner (xylene/n-butanol=8/2 mass ratio) were measured in order. Then 5.0 parts by mass of the powdery thixotropic denaturing agent obtained in Preparation examples 1-8 and Comparative preparation examples 1-8 was added successively, and dispersion at 3000 rpm for 10 min with a Labodisper to give the dispersion liquid. After that, dispersion at 3000 rpm for 30 min with a Labodisper in a 60° C. water bath gave the paint sample. In addition, the paint without adding the powdery viscosity modifier was used as the blank paint sample.

(Preparation of Paint Sample and Blank Paint Sample for Evaluation: Condition B)

135 parts by mass of epoxy resin jER 828 (trade name, available from Mitsubishi Chemical Co., Ltd.), 15 parts by mass of titanium oxide TIPAQUE CR-95 (trade name, available from Ishihara Sangyo Kaisha, Ltd.), 60 parts by mass of talc, 60 parts by mass of precipitating barium sulfate, and 30 parts by mass of thinner (xylene/n-butanol=8/2 mass ratio) were measured in order. Then 5.0 parts by mass of the powdery thixotropic denaturing agent obtained in Application examples 1-4 and Comparative application examples 1-4 was added successively, and dispersion at 3000 rpm for 10 min with a Labodisper to give the dispersion liquid. After that, dispersion at 3000 rpm for 30 min with a Labodisper in an 80° C. water bath gave the paint sample. In addition, the paint without adding the powdery viscosity modifier was used as the blank paint sample.

(Viscosity Measurement of Paint Sample and Blank Paint Sample for Evaluation)

To 80.0 parts by mass of each paint sample and blank paint sample obtained under preparation conditions A and B was added 18.0 parts by mass of amine resin ST12 (trade name, available from Mitsubishi Chemical Co., Ltd.), and the mixture was stirred by hand with a spatula for 3 min. After each coating solution sample was set to 25° C., the viscosity (mPa·s) at 6 rpm and 60 rpm was measured with a B-type viscometer. The viscosity at 6 rpm was divided by the viscosity at 60 rpm, and the TI value (Thixotropic Index)

was calculated. The TI value indicates that the higher the value, the better the thixotropic denaturing property. The results are shown in Table 3.

(Viscosity Measurement after Solvent Dilution of Paint Sample and Blank Paint Sample for Evaluation)

To each paint sample and coating solution sample mixed with the blank paint and the amine resin was added further 6.0 parts by mass of thinner (xylene/n-butanol=8/2 mass ratio) as a dilution solvent, and the mixture was stirred by hand with a spatula for 2 min. After each coating solution sample diluted by the solvent was set to 25° C., the viscosity (mPa·s) at 6 rpm and 60 rpm was measured with a B-type viscometer. The results are shown in Table 3.

TABLE 3

Results of Use Example-I

| Sample name | con-ditions | Main ingredient + Hardener Viscosity (mPa · s) 6 rpm | Main ingredient + Hardener Viscosity (mPa · s) 60 rpm | TI value | Main ingredient + Hardener + Solvent dilution Viscosity (mPa · s) 6 rpm | Main ingredient + Hardener + Solvent dilution Viscosity (mPa · s) 60 rpm | TI value |
|---|---|---|---|---|---|---|---|
| Blank | A | 2000 | 2000 | 1.0 | 800 | 800 | 1.0 |
| | B | 2000 | 2000 | 1.0 | 800 | 700 | 1.1 |
| Example.1 | A | 16000 | 4000 | 4.0 | 8000 | 2000 | 4.0 |
| | B | 21000 | 5000 | 4.2 | 14000 | 2000 | 7.0 |
| Example.2 | A | 16000 | 4000 | 4.0 | 9000 | 2000 | 4.5 |
| | B | 20000 | 5000 | 4.0 | 12000 | 2000 | 6.0 |
| Example.3 | A | 16000 | 4000 | 4.0 | 8000 | 2000 | 4.0 |
| | B | 19000 | 5000 | 3.8 | 12000 | 2000 | 6.0 |
| Example.4 | A | 18000 | 4000 | 4.5 | 9000 | 2000 | 4.5 |
| | B | 21000 | 5000 | 4.2 | 14000 | 2000 | 7.0 |
| Example.5 | A | 16000 | 5000 | 3.2 | 8000 | 2000 | 4.0 |
| | B | 19000 | 6000 | 3.2 | 10000 | 2000 | 5.0 |
| Example.6 | A | 17000 | 4000 | 4.3 | 9000 | 2000 | 4.5 |
| | B | 20000 | 5000 | 4.0 | 13000 | 2000 | 6.5 |
| Example.7 | A | 16000 | 4000 | 4.0 | 9000 | 2000 | 4.5 |
| | B | 21000 | 5000 | 4.2 | 12000 | 2000 | 6.0 |
| Example.8 | A | 17000 | 5000 | 3.4 | 10000 | 2000 | 5.0 |
| | B | 22000 | 5000 | 4.4 | 15000 | 2000 | 7.5 |
| Comparative | A | 5000 | 3000 | 1.7 | 1000 | 900 | 1.1 |
| example.1 | B | 6000 | 4000 | 1.5 | 2000 | 1000 | 2.0 |
| Comparative | A | 5000 | 4000 | 1.3 | 1000 | 900 | 1.1 |
| example.2 | B | 7000 | 5000 | 1.4 | 1000 | 1000 | 1.0 |
| Comparative | A | 7000 | 4000 | 1.8 | 1000 | 900 | 1.1 |
| example.3 | B | 8000 | 5000 | 1.6 | 2000 | 1000 | 2.0 |
| Comparative | A | 7000 | 6000 | 1.2 | 1000 | 900 | 1.1 |
| example.4 | B | 8000 | 7000 | 1.1 | 1000 | 900 | 1.1 |
| Comparative | A | 7000 | 4000 | 1.8 | 1000 | 800 | 1.3 |
| example.5 | B | 8000 | 5000 | 1.6 | 1000 | 800 | 1.3 |
| Comparative | A | 7000 | 3000 | 2.3 | 2000 | 1000 | 2.0 |
| example.6 | B | 6000 | 4000 | 1.5 | 2000 | 1000 | 2.0 |
| Comparative | A | 7000 | 6000 | 1.2 | 1000 | 900 | 1.1 |
| example.7 | B | 6000 | 6000 | 1.0 | 2000 | 1000 | 2.0 |
| Comparative | A | 3000 | 2000 | 1.5 | 1000 | 900 | 1.1 |
| example.8 | B | 4000 | 3000 | 1.3 | 2000 | 1000 | 2.0 |

(Evaluation of Anti-Sagging Property after Solvent Dilution of Paint Sample and Blank Paint Sample for Evaluation)

Each paint sample and blank paint sample obtained under the preparation conditions A and B was painted on a glass plate using a sag-tester, and the plate was immediately stood vertically. After drying at room temperature for 1 day, the coating film state was observed visually. The film thickness just before the sagging of the coating film was evaluated as the limiting film thickness. The results are shown in Table 4.

TABLE 4

Evaluation of anti-dripping after solvent dilution

| Sample name | conditions | Limit film thickness for anti-sagging(μm) |
|---|---|---|
| Blank | A | 100 |
| | B | 100 |
| Example.1 | A | 400 |
| | B | 600 |
| Example.2 | A | 400 |
| | B | 600 |
| Example.3 | A | 400 |
| | B | 600 |
| Example.4 | A | 400 |
| | B | 600 |
| Example.5 | A | 400 |
| | B | 600 |
| Example.6 | A | 400 |
| | B | 600 |
| Example.7 | A | 400 |
| | B | 600 |
| Example.8 | A | 500 |
| | B | 700 |
| Comparative | A | 100 |
| example.1 | B | 200 |
| Comparative | A | 100 |
| example.2 | B | 100 |
| Comparative | A | 100 |
| example.3 | B | 100 |
| Comparative | A | 100 |
| example.4 | B | 100 |
| Comparative | A | 100 |
| example.5 | B | 100 |
| Comparative | A | 100 |
| example.6 | B | 200 |
| Comparative | A | 100 |
| example.7 | B | 200 |
| Comparative | A | 100 |
| example.8 | B | 100 |

As the evaluation results can be confirmed from Table 3 and Table 4, the powdery viscosity modifier of the present invention shows a superior viscosity-increasing effect (the viscosity values at 6 rpm and 60 rpm) and an anti-sagging effect (the TI value, the limiting film thickness for anti-sagging) than those of the blank paint. Furthermore, it shows a superior viscosity-increasing effect (the viscosity values at 6 rpm and 60 rpm) and an anti-sagging effect (the TI value, the limiting film thickness for anti-sagging) than those of Comparative examples 1-8.

Application Example II (Experiment Using Rosin Resin)

To a 1000 mL reaction vessel equipped with a stirrer, a thermometer, a water divider, and a nitrogen gas inlet were measured 150 parts by mass of the rosin resin and 150 parts by mass of hexydiglycol, and the mixture was heated up to 200° C. while stirring at low speed. Then 9.0 parts by mass of the powdery thixotropic denaturing agent obtained in Application examples 1-8 and Comparative examples 1-8 was added successively and dissolved. After confirming visually the dissolution of the powdery thixotropic denaturing agent, the mixture was immediately cooled down to 30° C. or less to give the resin pre-gel.

(Viscosity Measurement of Resin Pre-Gel and Blank Resin Pre-Gel for Evaluation)

After the resin pre-gel and the blank resin pre-gel for evaluation prepared were set to 25° C., the viscosity (mPa·s) at 6 rpm and 60 rpm was measured with a B-type viscometer. The viscosity at 6 rpm was divided by the viscosity at 60 rpm, and the TI value (Thixotropic Index) was calculated. The results are shown in Table 5.

(Evaluation of Anti-Sagging Property of Resin Pre-Gel and Blank Resin Pre-Gel for Evaluation)

The resin pre-gel and the blank resin pre-gel for evaluation prepared were painted on a glass plate using a sag-tester, and the plate was immediately stood vertically. After drying at room temperature for 1 day, the coating film condition was observed visually. The film thickness just before the sagging of the coating film was evaluated as the limiting film thickness. The results are shown in Table 5.

TABLE 5

Results of Use Example-II

| Sample name | Viscosity (mPa · s) 6 rpm | Viscosity (mPa · s) 60 rpm | TI value | Limit film thickness for anti-sagging(μm) |
|---|---|---|---|---|
| Blank | 500 | 400 | 1.3 | 100 |
| Example.1 | 8000 | 2000 | 4.0 | 500 |
| Example.2 | 9000 | 2000 | 4.5 | 500 |
| Example.3 | 8000 | 2000 | 4.0 | 500 |
| Example.4 | 9000 | 3000 | 3.0 | 400 |
| Example.5 | 9000 | 2000 | 4.5 | 500 |
| Example.6 | 9000 | 3000 | 3.0 | 400 |
| Example.7 | 8000 | 2000 | 4.0 | 400 |
| Example.8 | 9000 | 2000 | 4.5 | 500 |
| Comparative example.1 | 600 | 600 | 1.0 | 100 |
| Comparative example.2 | 500 | 400 | 1.3 | 100 |
| Comparative example.3 | 600 | 400 | 1.5 | 100 |
| Comparative example.4 | 500 | 400 | 1.3 | 100 |
| Comparative example.5 | 600 | 400 | 1.5 | 100 |
| Comparative example.6 | 700 | 500 | 1.4 | 100 |
| Comparative example.7 | 200 | 200 | 1.0 | 100 |
| Comparative example.8 | 200 | 200 | 1.0 | 100 |

As the evaluation results can be confirmed from Table 5, the powdery viscosity modifier of the present invention shows a superior viscosity-increasing effect (the viscosity values at 6 rpm and 60 rpm) and an anti-sagging effect (the TI value) than those of the blank paint sample. Furthermore, it shows a superior viscosity-increasing effect and an anti-sagging effect than those of Comparative examples 1-8. As clearly shown in these results, it can be concluded that the present invention exhibits the suitable powdery viscosity modifier for solder and adhesive paints which require manufacturing work at high temperatures.

INDUSTRIAL APPLICABILITY

The viscosity modifier of the present invention is used by the addition to a paint, a coating agent, a painting agent, a flux, an adhesive material, or a sealing material, and can provide an excellent viscosity-increasing effect and/or an anti-sagging effect. The manufacturing method is used to produce conveniently a large quantity of the viscosity modifier.

In addition, the viscosity modifier of the present invention is used as a paint, a coating agent, a painting agent, a flux, an adhesive material, or a sealing material.

What is claimed is:

1. A viscosity modifier for a paint, a coating material, a painting material, a flux, an adhesive material, or a sealing material, the viscosity modifier consisting of:

polyamide components alone or the polyamide components together with one or more additives selected from the group consisting of an anti-foaming agent, an anti-rusting agent, surfactants, a thermosetting agent, a matting agent, a leveling agent, a lubricant, a wetting agent, and a dispersant, the polyamide components consisting of a mixture of:

a mol ratio of 70%-85% of a first polyamide compound represented by the following chemical formula (1):

M-D-A-D-M (1)

wherein in the chemical formula (1), M is an aliphatic monocarbonyl group derived from a C12-30 linear, branched and/or cyclic saturated or unsaturated and unsubstituted or hydroxy-substituted aliphatic monocarboxylic acid, D is a diamino group derived from a C2-10 saturated or unsaturated and linear, branched and/or cyclic aliphatic and/or C6-10 aromatic primary diamine, and A is an aliphatic dicarbonyl group derived from a C12-36 saturated or unsaturated and linear, branched and/or cyclic aliphatic dicarboxylic acid as a polybasic acid, wherein the first polyamide compound consists of a compound that is dehydrate-condensed from a ratio of $n_1+1$ mol, wherein $n_1$ is 1-3, of the aliphatic and/or aromatic primary diamine, a ratio of $n_1$ mol of the aliphatic dicarboxylic acid, and a ratio of 2 mol of the aliphatic monocarboxylic acid, a mol ratio of 10%-20% of a second polyamide compound represented by the following chemical formula (2):

M-D-M (2)

wherein in the chemical formula (2), M and D are the same as above, wherein the second polyamide compound consists of a compound that is dehydrate-condensed from a ratio of 1 mol of the aliphatic and/or aromatic primary diamine, and a ratio of 2 mol of the aliphatic monocarboxylic acid, a mol ratio of 5%-10% of a third polyamide compound represented by the following chemical formula (3):

$M\text{-}(D\text{-}A)_n\text{-}D\text{-}M$ (3)

wherein in the chemical formula (3), M, A and D are the same as above, and n is a number of 2-3, wherein the third polyamide compound consists of a compound that is dehydrate-condensed from a ratio of $n_1+1$ mol, wherein $n_1$ is 1-3, of the aliphatic and/or aromatic primary diamine, a ratio of $n_1$ mol of the aliphatic dicarboxylic acid, and a ratio of 2 mol of the aliphatic monocarboxylic acid, and a mol ratio of 0%-15% of a fourth polyamide compound represented by the following chemical formula (4):

$A_{m1}\text{-}(D\text{-}A)_{m2}\text{-}D_{m3}$ (4)

wherein in the chemical formula (4), D and A are the same as above, m1 and m3 are independently a number of 0 or 1, and m1+m2+m3 is a number of 2-6, wherein the fourth polyamide compound consists of a compound that is dehydrate-condensed from a ratio of 1 mol of the aliphatic and/or aromatic primary diamine, and a ratio of 1 mol of the aliphatic dicarboxylic acid, a melting point of the polyamide components is 120° C.-250° C., and a softening point of the polyamide components is 180° C.-194° C.

2. The viscosity modifier according to claim 1, wherein the melting point of the polyamide components is 120° C.-200° C.

3. The viscosity modifier according to claim 1, wherein a softening point of the polyamide components is 190° C.-192° C.

4. The viscosity modifier according to claim 1, wherein a solubility parameter value of the polyamide components, which is determined by a Fedors method, is 9.0-10.2.

5. The viscosity modifier according to claim 1, wherein the viscosity modifier is a finely pulverized powder having a particle size of 100 μm or less.

6. The viscosity modifier according to claim 1, wherein the viscosity modifier is a thixotropic agent, a thixotropy agent, a thickener agent, an anti-sagging agent, and/or an anti-settling agent for filler components.

7. The viscosity modifier according to claim 1, wherein the additives include an anti-foaming agent, an anti-rusting agent, surfactants, a thermosetting agent, a matting agent, a leveling agent, a lubricant, a wetting agent, or a dispersant.

* * * * *